US012404481B1

(12) United States Patent
Burbank et al.

(10) Patent No.: US 12,404,481 B1
(45) Date of Patent: Sep. 2, 2025

(54) DISSOLVABLE CLEANING PRODUCTS FREE OF PLASTICS AND/OR POLYVINYL ALCOHOL

(71) Applicant: Tru Earth Environmental Products Inc., Port Moody (CA)

(72) Inventors: Malcolm Bond Burbank, Pullman, WA (US); James Rodney Dickerson, Homer, LA (US); Darren Gross, Midland, MI (US); Laura Hinojosa, Kitchener (CA)

(73) Assignee: Tru Earth Environmental Products Inc., Port Moody (CA)

( * ) Notice: Subject to any disclaimer, the term of this patent is extended or adjusted under 35 U.S.C. 154(b) by 0 days.

(21) Appl. No.: 19/050,545

(22) Filed: Feb. 11, 2025

Related U.S. Application Data

(60) Provisional application No. 63/706,869, filed on Oct. 14, 2024, provisional application No. 63/561,075, filed on Mar. 4, 2024.

(51) Int. Cl.

| | |
|---|---|
| ***C11D 11/00*** | (2006.01) |
| ***C11D 1/26*** | (2006.01) |
| ***C11D 1/28*** | (2006.01) |
| ***C11D 3/20*** | (2006.01) |
| ***C11D 3/22*** | (2006.01) |
| ***C11D 3/50*** | (2006.01) |
| ***C11D 17/06*** | (2006.01) |

(52) U.S. Cl.
CPC ................ *C11D 17/06* (2013.01); *C11D 1/28* (2013.01); *C11D 3/2065* (2013.01); *C11D 3/2079* (2013.01); *C11D 3/2082* (2013.01); *C11D 3/225* (2013.01); *C11D 3/50* (2013.01); *C11D 11/00* (2013.01)

(58) Field of Classification Search
None
See application file for complete search history.

(56) References Cited

U.S. PATENT DOCUMENTS

| | | | | |
|---|---|---|---|---|
| 2011/0028374 | A1* | 2/2011 | Fossum | C11D 3/0052 510/296 |
| 2021/0261892 | A1* | 8/2021 | Xu | C11D 1/835 |
| 2022/0054365 | A1* | 2/2022 | Xu | C11D 11/0082 |
| 2022/0226227 | A1* | 7/2022 | Lim | A61K 8/466 |
| 2022/0323314 | A1* | 10/2022 | Farias | A61K 8/046 |
| 2025/0051693 | A1* | 2/2025 | Tremblay | C11D 3/001 |

* cited by examiner

*Primary Examiner* — Lorna M Douyon
(74) *Attorney, Agent, or Firm* — DLA PIPER LLP (US)

(57) ABSTRACT

Methods, systems, and apparatuses for forming dissolvable cleaning products. The dissolvable cleaning products may be formed by forming a first component solution by mixing ingredients in a first mixer. The mixing may be suspended and the first component solution may be allowed to rest for a first holding period. A second component solution may be formed by mixing ingredients in a second mixer. The mixing may be suspended and the second component solution may be allowed to rest for a second holding period. The first and second component solutions may be mixed together and one or more of enzymes and preservatives and a water-soluble polymer may be added to form a final solution. Optionally one or more fragrances may be added. The final solution may be transferred to a mold and dried to a predetermined moisture content. The dried final solution may be cut into one or more shapes.

11 Claims, 6 Drawing Sheets

DISSOLVABLE CLEANING PRODUCTS FREE OF PLASTICS AND/OR POLYVINYL ALCOHOL

CROSS-REFERENCE TO RELATED APPLICATIONS

This application claims benefit of U.S. Provisional Patent Appln. No. 63/561,075 filed on Mar. 4, 2024 and U.S. Provisional Patent Appln. No. 63/706,869 filed on Oct. 14, 2024. The entireties of these applications are hereby incorporated herein by reference.

TECHNICAL FIELD

The present disclosure generally relates to the field of cleaning products, and more particularly to dissolvable cleaning products that are free of plastics and/or polyvinyl alcohol ("PVA") and methods, processes, and apparatuses for making the same.

BACKGROUND

The majority of conventional cleaning products come in as a liquid in a vessel with a dispenser or in packs/pods that are wrapped in one or more types of plastic. These vessels are mostly made up of plastic, glass, and/or cardboard lined with plastic to serve as a water barrier. However, single use plastic is wreaking havoc on the environment and plastic residues have been found to have determinantal effects on health. Only a small percentage of all plastic is actually recycled, and packaging generates the largest portion of municipal waste. Packaged products are inefficient for businesses and the people who buy them.

Due to changes in customer buying behavior, and a focus on sustainability, cleaning products having a reduced package size and that do not contain plastics are becoming more popular. Thus, a need exists for new stable formulations of cleaning products that meet the needs of consumers, while also reducing the amount of waste, such as plastics, generated in their production and shipping.

SUMMARY

Methods, systems, and apparatuses for forming dissolvable cleaning products. The dissolvable cleaning products may be formed by forming a first component solution in a first mixer by: adding a first portion of water to the first mixer, the first portion of water having a first temperature, adding water-soluble cellulose ethers to the first portion of water and mixing for a first mixing time to form a first mixture, and adding a second portion of water to the first mixture and mixing for a second mixing time, the second portion of water having a second temperature. A second component solution may be formed in a second mixer by: adding a third portion of water to the second mixer, the third portion of water having a third temperature, adding a surfactant to the third portion of water and mixing for a third mixing time to form a second mixture, and adding sodium citrate to the second mixture and mixing for a fourth mixing time. The first component solution to rest for a first holding period. The second component solution to rest for a second holding period. A final solution may be formed in a third mixer by: adding the second component solution to the third mixer, adding a water-soluble polymer to the third mixer and mixing for a fifth mixing time, ceasing mixing after the fifth mixing time, adding the first component solution to the third mixer after the fifth mixing time and mixing for a sixth mixing time, and adding one or more of enzymes and preservatives the third mixer and mixing for a seventh mixing time. The final solution may be transferred to a mold. The final solution may be dried within the mold to a predetermined moisture content. The dried final solution may be removed from the mold and cut into one or more shapes.

In another example, the dissolvable cleaning products may be formed by forming a first component solution in a first mixer by: adding a first portion of water to the first mixer, the first portion of water having a first temperature, adding water-soluble cellulose ethers to the first portion of water and mixing for a first mixing time to form a first mixture, and adding a second portion of water to the first mixture and mixing for a second mixing time, the second portion of water having a second temperature. A second component solution may be formed in a second mixer by: adding a third portion of water to the second mixer, the third portion of water having a third temperature, adding a surfactant to the third portion of water and mixing for a third mixing time to form a second mixture, and adding sodium citrate to the second mixture and mixing for a fourth mixing time. The first component solution may be allowed to rest for a first holding period. The second component solution may be allowed to rest for a second holding period. A final solution may be formed in a third mixer by: mixing the first component solution and the second component solution in the third mixer for a fifth mixing time to form an intermediate solution, and adding one or more of dry ingredients and liquid ingredients to the intermediary solution and mixing for a sixth mixing time. The final solution may be transferred to a mold. The final solution may be dried within the mold to a predetermined moisture content. The dried final solution may be removed from the mold and cut into one or more shapes.

A dissolvable cleaning product may include approximately 6.1 wt % to approximately 6.7 wt % of water-soluble cellulose ethers, approximately 38.4 wt % to approximately 41.9 wt % of a surfactant, approximately 9.2 wt % to approximately 10.1 wt % of sodium citrate, approximately 1.5 wt % to approximately 1.7 wt % of preservatives, approximately 30.7 wt % to approximately 33.6 wt % of a water-soluble polymer, and approximately 6 wt % to approximately 12 wt % of water. The dissolvable cleaning product may further include approximately 2.0 wt % to approximately 2.1 wt % of one or more fragrances. The dissolvable cleaning product may be a sheet that includes two strips separated down a middle of the sheet by a feature that allows the two strips to be separated. The feature may be one or more of a perforation and an indentation. The sheet may have a weight of approximately 3.8 g.

BRIEF DESCRIPTION OF THE DRAWINGS

The drawings described below are for illustration purposes only. The drawings are not intended to limit the scope of the present disclosure.

DETAILED DESCRIPTION

Figure 1:
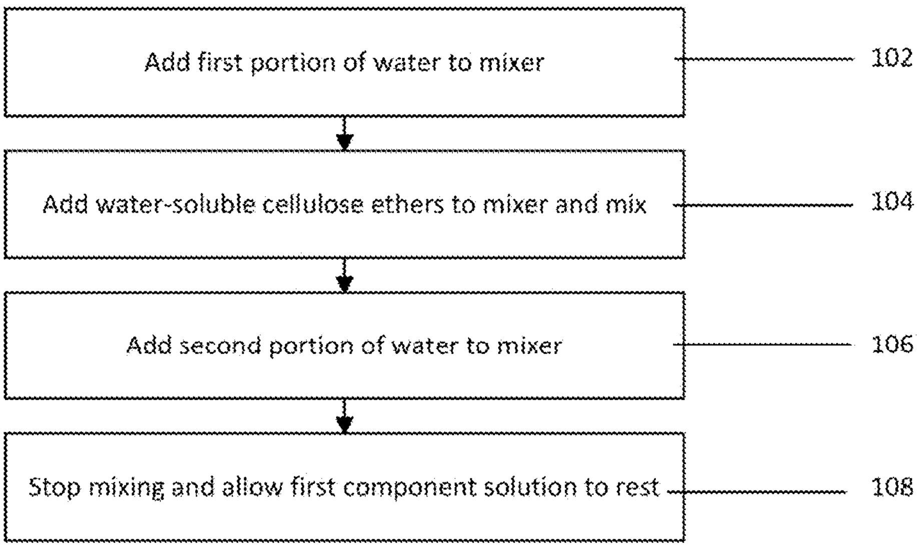
FIG. 1 is a flowchart illustrating an example method of forming a first component solution, according to an example of the present disclosure.

Liquid and powder cleaning products are known and in the market. A problem with these known forms of un-premeasured cleaning products is that consumers are required to measure out appropriate amounts from containers, which often leads to consumers using too much, or too little. Furthermore, the process of measuring out the liquid or powder is inconvenient, and messy, often leading to accidental spills. Additionally, the containers themselves cause problems as they increase the costs of shipping and storing the products through the supply chain. These large containers may also be hard for consumers to handle, store, and use, and may be a burden on the environment as a result of their disposal as solid waste. Even recyclable containers, such as those made from plastic, must be collected and transported to recycling sites to be sorted into like materials and may not end up being recycled at all.

Attempts to overcome the problems associated with the liquid and powder cleaning products have led to the development of products containing pre-measured amounts in single use dosage forms, such as dissolvable pouches containing, for example, liquid detergent (and often other cleaning aids), and detergent sheets. These dissolvable cleaning products have a relatively small footprint, resulting in substantially lower shipping and storage costs throughout the supply chain. Their small physical dimensions also make dissolvable cleaning products eco-friendly since far less carbon is generated from fossil fuel energy spent in transporting them from their place of manufacture to the ultimate consumer, as compared to their bulkier liquid, powder, and pouch counterparts.

However, conventional processes used to produce dissolvable cleaning products do not produce products that have a consistent composition. These inconsistencies may result in high variations in performance (e.g., dissolvability and the ability to clean), as well as presenting problems in handling and packaging. These problems create frustration in consumers who embrace the concept of reducing impact on the environment with waste including packaging and transportation and may lead to a slower adoption by the general public.

For example, some conventional processes to make dissolvable cleaning products utilize a two-part formulation having a first part that is deemed shelf-stable and is made in advance and stored. A second part must be combined with the first part just before the two-part formulation is processed by machines to form sheets. These machines rely upon viscosity to determine the uniformity of the spreading and the subsequent sheets that are formed, dried, then cut into strips and packaged.

The variability in the mixing efficiency in the two parts, plus the timing of when they are combined, may impact the distribution of the ingredients. This, in turn, may impact the viscosity of the two-part formulation and the ability of the material to uniformly spread across and stick to the rollers used in manufacturing machines. The inconsistency in this spreading and stickiness results in inconsistencies in the large sheets thickness and composition as they are formed (e.g., their drying characteristics and the dimensions of the finished product cut from these sheets) as well as the dissolving characteristics of the individually cut strips.

Furthermore, conventional dissolvable cleaning products are still typically made using plastics to either encapsulate and/or bind the cleaning product in its single use form. This presents a problem as the plastics, once dissolved, may enter the water supply and contribute to global pollution. In oceans alone, annual plastic pollution, from all types of plastics, was estimated at 4 million to 14 million tons in the early 21$^{st}$ century. Not only are microplastics harmful to ocean and aquatic life, but they are also increasingly being detected in humans. These problems pose a threat on their own, but also create frustration in consumers who embrace the concept of reducing impact on the environment with waste including packaging and transportation and may lead to a slower adoption by the general public.

Accordingly, an improved method of forming dissolvable cleaning products is desired. The following description contains examples of methods, systems, and apparatus that produce dissolvable cleaning products that are free of plastics and/or PVA have a consistent composition and increased performance over conventional products.

The dissolvable cleaning product shapes may be prepared from mixing one or more ingredients to form a first component solution, mixing one or more ingredients to form a second component solution, mixing the second component solution with the first component solution to form an intermediate solution, and mixing a third component solution with the intermediate solution to form a final solution. The final solution may be used to form the dissolve cleaning product (e.g., via one or more of an extrusion process and a mold).

Referring now to FIG. 1, a flowchart illustrating an example method of forming the first component solution is shown. The first component solution may include, but is not limited to, one or more of: approximately 3 wt % to approximately 10 wt % of water-soluble cellulose ethers (e.g., Methocel™) and approximately 90 wt % to approximately 97 wt % of water (e.g., de-ionized water). In an example, the first component solution may include approximately 3.8 wt % of water-soluble cellulose ethers and approximately 96.2% wt % of water.

The exemplary method of forming the first component solution may include adding a first portion of water to a mixer, adding water-soluble cellulose ethers to the mixer and mixing, adding a second portion of water to the mixer, and stopping mixing to allow the first component solution to rest.

In step 102, a first portion of water may be added to a first mixer. The first portion of water may be heated to a temperature ranging from approximately 92° C. to approximately 95° C. either prior to being added to the first mixer or while in the first mixer. The first mixer may be jacketed to allow for temperature control during mixing. The first portion of the water may be approximately 30 wt % of a total amount of water used to make the first component solution. The first mixer may be turned on and set to mix with at a low rotational speed. The rotational speed of the first mixer may range from approximately 3,000 to approximately 6,000 rotations per minute (rpm). The first mixer may contain one or more mixing paddles configured to reduce the incorporation of gas bubbles during mixing and may also rotate the paddles in a specific pattern configured to reduce bubble formation and incorporation. The first mixer may include a high shear mixer with a shearing head.

In step 104, the water-soluble cellulose ethers may be added to the first mixer to form a first mixture. The water-soluble cellulose ethers may be a powder and may be added at a rate that allows the powder to distribute somewhat evenly in the water. The water-soluble cellulose ethers may be Methocel™ A15C. The water-soluble cellulose ethers may be added to the first portion of the water and mixed until substantially all of the water-soluble cellulose ethers are incorporated. The mixing may take approximately 15 minutes. However, it will be appreciated that a shorter mixing time may also yield acceptable results. Furthermore, the mixing time may be extended for a longer time if necessary.

At step 106, a second portion of the water may be added to the first mixer and mixed in. The second portion of water may be approximately 70 wt % of a total amount of water used to make the first solution. The second portion of water may be chilled to approximately 4° C. (or less) prior to being added to the first mixer. The first mixer may operate at a substantially similar rotational speed as in steps 102 and 104. The mixing may take approximately 15 minutes. However, it will be appreciated that a shorter mixing time may also yield acceptable results. Furthermore, the mixing time may be extended for a longer time if necessary.

In step 108, the mixing may cease, and the first component solution may be allowed to rest for a first holding period. In an example, the first component solution may be allowed to sit in the first mixer with a cover for the first holding period. In another example, the first component solution may be dispersed into a covered container for the first holding period. The first holding period may be approximately 8 hours to approximately 24 hours, although longer and shorter periods of time are contemplated. During the first holding period the first component solution may be kept at approximately room temperature (e.g., approximately 18° C. to approximately 20° C.) during the first holding period. The first holding period may allow for the completion of all polymerization reactions and for gases to release from the mixture. A vacuum may be applied to the first component solution to assist in expediting off gassing.

Figure 2:
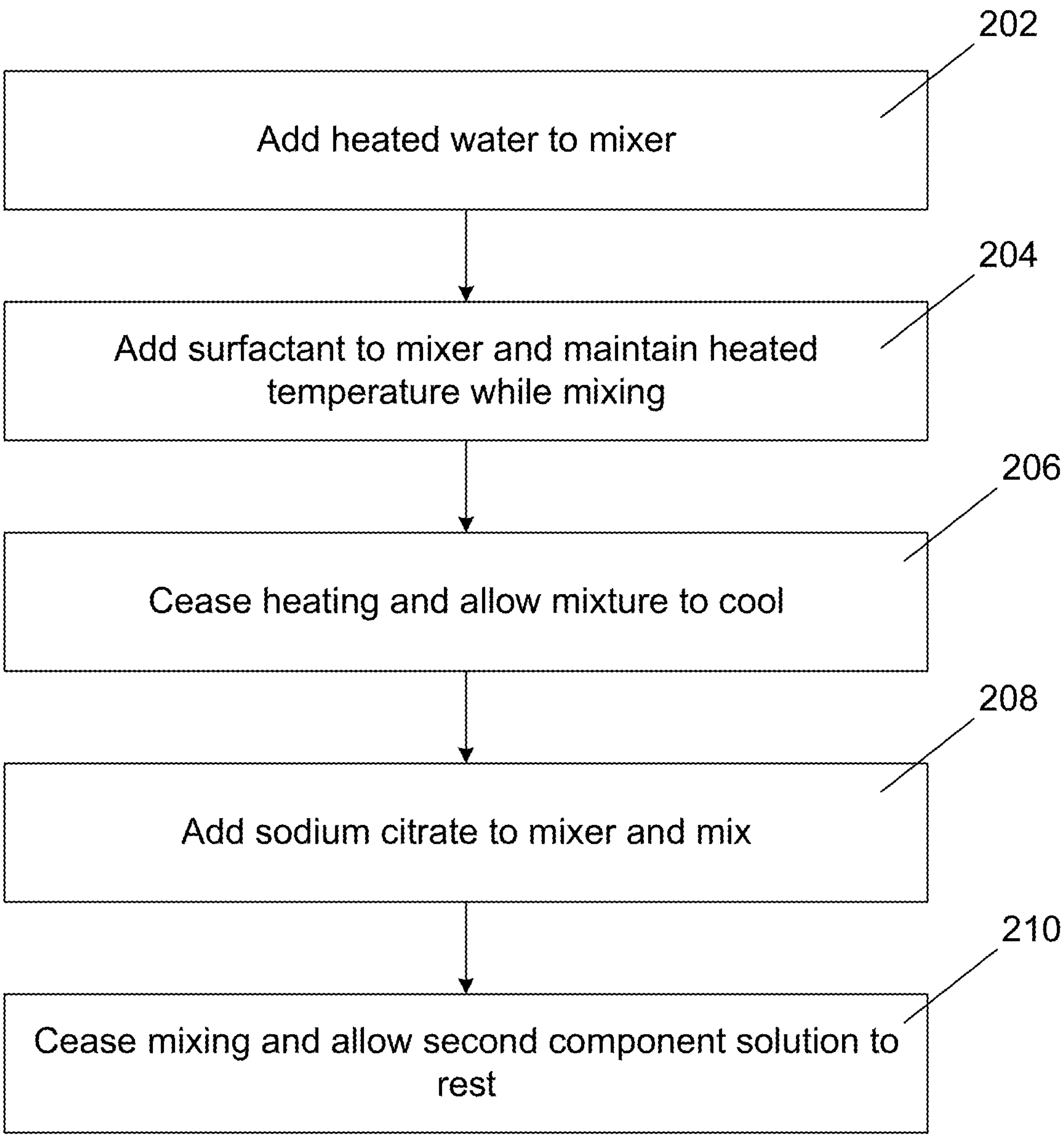
FIG. 2 is a flowchart illustrating an example method of forming the second component solution, according to an example of the present disclosure.

Referring now to FIG. 2, a flowchart illustrating an example method of forming the second component solution is shown. The second component solution may include, but is not limited to, one or more of: approximately 15 wt % to approximately 30 wt % of a surfactant, approximately 3 wt % to approximately 7 wt % of sodium citrate, and approximately 63 wt % to approximately 82 wt % of water. In an example, the second component solution may include approximately 19.1 wt % of the surfactant, approximately 4.6 wt % of the sodium citrate, and approximately 76.3 wt % of water. In another example, the second component solution may include approximately 19.7 wt % of the surfactant, approximately 4.7 wt % of the sodium citrate, and approximately 75.6 wt % of water. The surfactant may be methyl ester sulfonate (MES).

The exemplary method of forming the second component solution may include adding water to a mixer and heating the water, adding methyl ester sulfonate to the mixer and mixing, stopping heating of the water, adding sodium citrate to the mixer and mixing, and stopping mixing and allowing the second component solution to rest.

In step 202, a third portion of water (e.g., de-ionized water) may be added to a second mixer. In an example, the first mixer and the second mixer may be the same mixer (i.e., the second mixer may be the empty and cleaned first mixer). In another example, the second mixer may be a separate mixer. The third portion of water may be heated to a temperature ranging from approximately 92° C. to approximately 95° C. prior to being added to the second mixer or while in the second mixer. The second mixer may be jacketed to allow for temperature control during mixing. The second mixer may be turned on and set to mix with at a predetermined rotational speed. The rotational speed of the second mixer may range from approximately 30 to approximately 60 rotations per minute (rpm). The second mixer may contain one or more mixing paddles configured to reduce the incorporation of gas bubbles during mixing and may also rotate the paddles in a specific pattern configured to reduce bubble formation and incorporation.

In step 204, the surfactant may be added to the second mixer to form a second mixture. The third portion of water may be maintained at the temperature ranging from approximately 92° C. to approximately 95° C. during the mixing process. The surfactant may be ground into a fine powder and/or granule prior to adding the surfactant to the heated third portion of water. The surfactant/water mixture may be mixed until substantially all of the surfactant has dissolved. The surfactant/water mixture may be mixed for approximately 40 minutes. However, it will be appreciated that a shorter mixing time may also yield acceptable results. Furthermore, the mixing time may be extended for a longer time if necessary to dissolve all of the surfactant in the third portion of water.

In step 206, heating of the second mixer may cease and the temperature of the surfactant/water may be allowed to drop.

In step 208, the sodium citrate may be added to the second mixer to form the second component solution. The sodium citrate may be mixed in with the surfactant/water mixture until fully incorporated. The sodium citrate may be mixed in for approximately 3 minutes to approximately 15 minutes. In an example, the sodium citrate may be mixed for approximately 5 minutes.

In step 210, the mixing may cease and the second component solution may be allowed to rest for a second holding period. In an example, the second component solution may be allowed to sit in the second mixer with a cover for the second holding period. In another example, the second component solution may be dispersed into a covered container for the second holding period. The second holding period may be approximately 8 hours to approximately 24 hours, although longer and shorter periods of time are contemplated. During the second holding period the second component solution may be kept at approximately room temperature (e.g., approximately 18° C. to approximately 20° C.) during the second holding period. The second holding period may allow for the completion of all polymerization reactions and for gases to release from the mixture. A vacuum may be applied to the second component solution to assist in expediting off gassing.

Figure 3A:
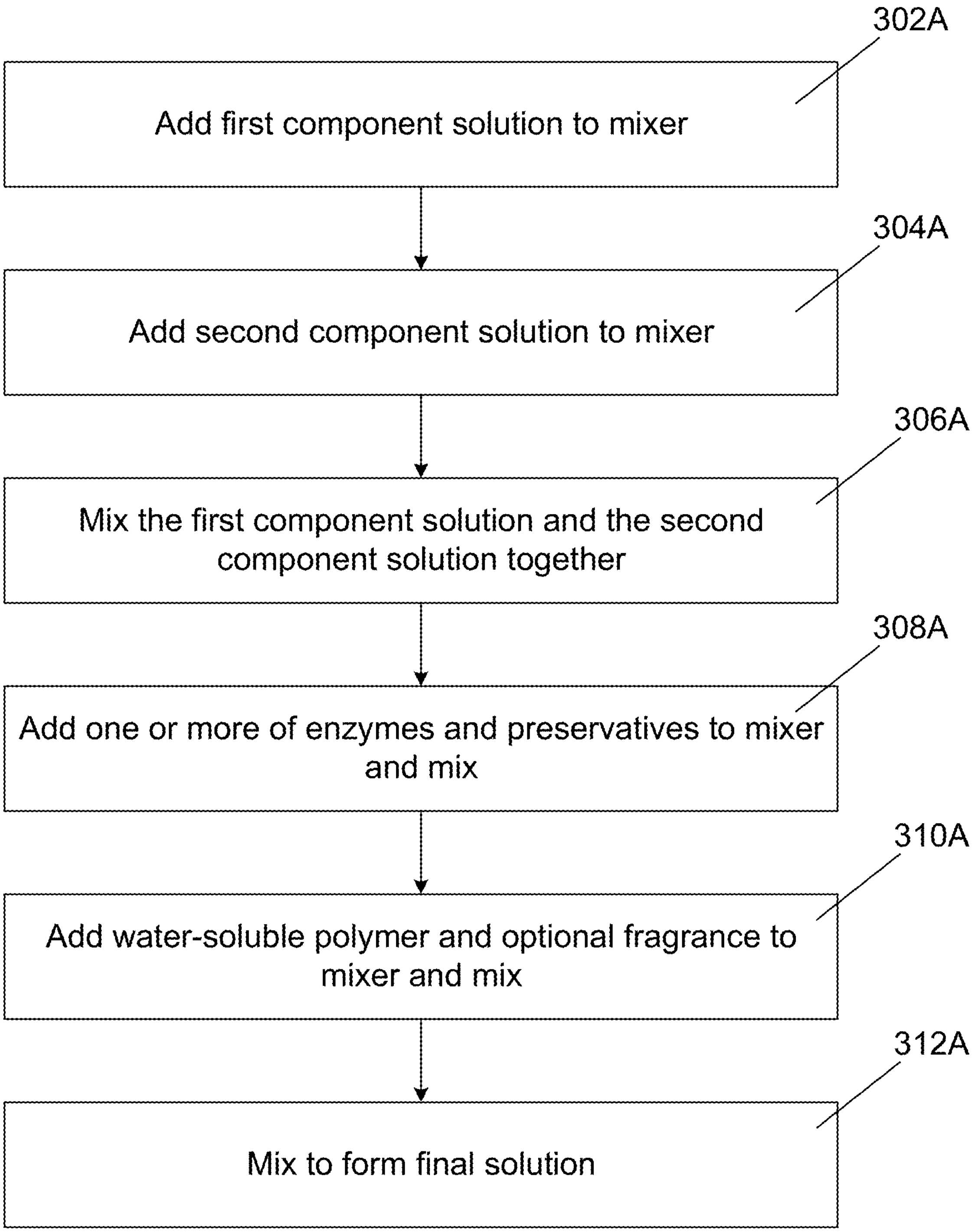
FIG. 3A is a flowchart illustrating a first exemplary method of forming the final solution is shown, according to an example of the present disclosure.

Referring now to FIG. 3A, a flowchart illustrating first exemplary method of forming the final solution is shown.

The first exemplary method of forming the final solution may include adding the first component solution to a mixer, adding the second component solution to the mixer, mixing the first component solution and the second component solution together, adding one or more of enzymes and preservatives, adding a water-soluble polymer to the mixer (and optionally one or more fragrances), and mixing together to form the final solution.

In step 302A, the first component solution may be added to a third mixer after the first holding period. In an example, the third mixer and one or more of the first mixer and the second mixer may be the same mixer. In another example, the third mixer may be a separate mixer. The third mixer may be jacketed to allow for temperature control during mixing.

In step 304A, the second solution may be added to the third mixer after the second holding period.

In step 306A, the third mixer may be turned on and set to mix with at a predetermined rotational speed. The rotational speed of the third mixer may range from approximately 30 to approximately 60 rotations per minute (rpm). The third mixer may contain one or more mixing paddles configured to reduce the incorporation of gas bubbles during mixing and may also rotate the paddles in a specific pattern configured to reduce bubble formation and incorporation. The first component solution and the second component solution may be mixed together for approximately 15 minutes to form the intermediate solution. However, it will be appreciated that a shorter mixing time may also yield acceptable results. Furthermore, the mixing time may be extended for a longer time if necessary.

In step 308A, the one or more of enzymes and preservatives may be added (either separately or together) to the third mixer and allowed to mix for approximately 5 minutes. The enzymes may include one or more of amylase, protease, lipase, and cellulase. The preservatives may include sodium benzoate and similar salts (e.g., calcium benzoate and potassium benzoate). What is desirable is to provide a preservative which inhibits growth of microbes and fungi. It will be appreciated by persons skilled in the art that other preservatives may be used in combination such as potassium sorbate, or other weak acids. All such other preservatives are within the scope of the present disclosure.

In step 310A, the water-soluble polymer may be added to the third mixer. In an example, the water-soluble polymer may be glycerin. Optionally, one or more fragrances may be added to the third mixer. The one or more fragrances may be non-toxic and non-irritating. The one or more fragrances may include, for example, one or more of extract. In an example, the extract may be organic. For example, the one or more fragrancies may include organic lemongrass extract. The organic lemongrass may be an essential oil and may be steam extracted from fresh grass and roots of a lemongrass plant. In another example, the one or more fragrances may include conventional fragrances that are typically used in applications such as soap, detergents, and personal care applications (e.g., lotion, shampoo, and liquid soap). For example, the one or more fragrances may include fresh linen, such as the Fresh Linen Fragrance Oil distributed by Bulk Apothecary.

In step 312A, the mixer may be allowed to run until the final solution is smooth in texture. The mixing may be for approximately 5 mins, although longer and shorter periods of time are contemplated.

Figure 3B:
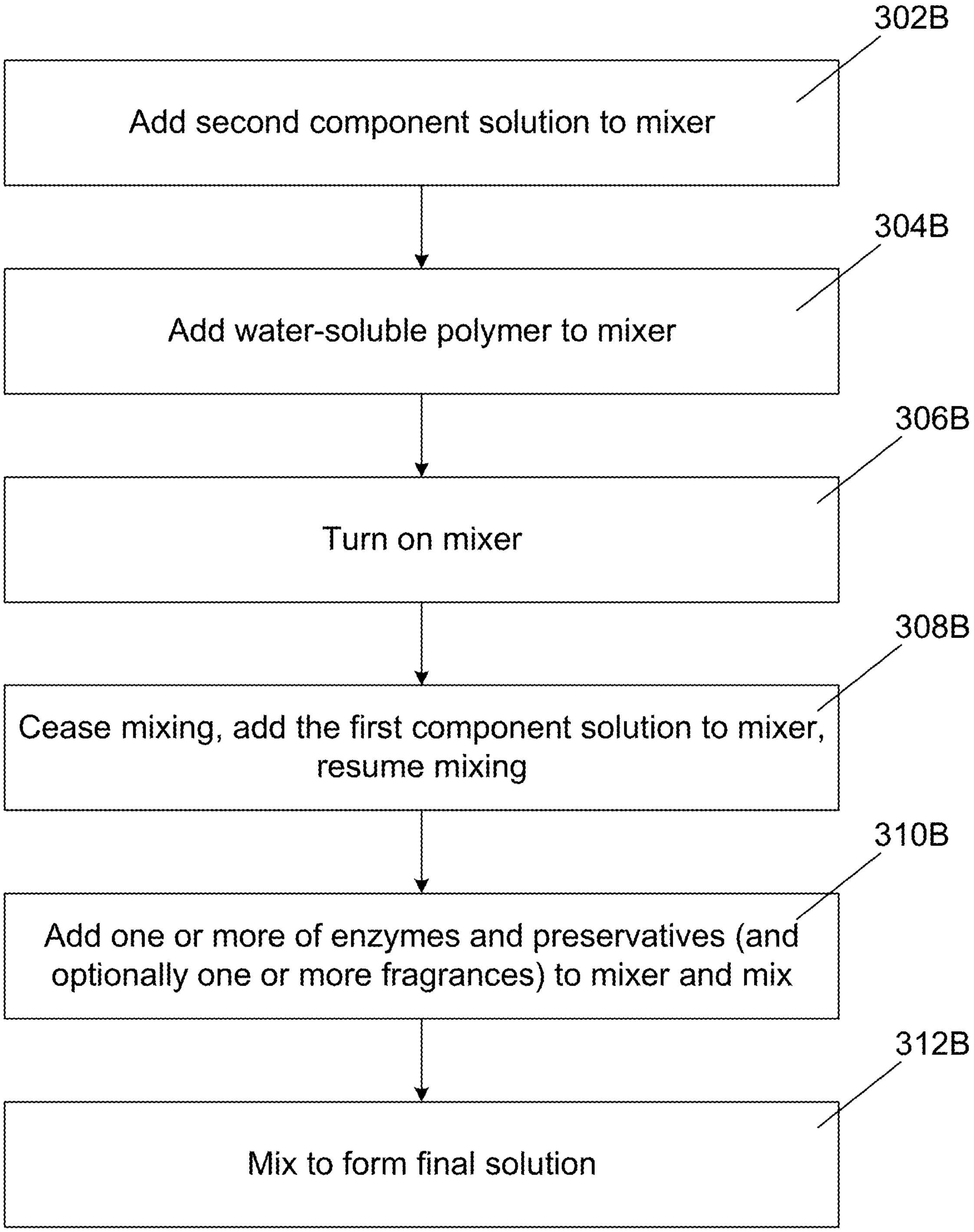
FIG. 3B is a flowchart illustrating a second exemplary method of forming the final solution is shown, according to an example of the present disclosure.

Referring now to FIG. 3B, a flowchart illustrating a second exemplary method of forming the final solution is shown.

The second exemplary method of forming the final solution may include adding the second component solution to a mixer, adding a water-soluble polymer to the mixer and mixing, stopping mixing and adding the second component solution to the mixer and continuing mixing, adding one or more of enzymes and preservatives (and optionally one or more fragrances) to the mixer and mixing together to form the final solution.

In step 302B, the first component solution may be added to a third mixer after the first holding period. In an example, the third mixer and one or more of the first mixer and the second mixer may be the same mixer. In another example, the third mixer may be a separate mixer. The third mixer may be jacketed to allow for temperature control during mixing.

In step 304B, the water-soluble polymer may be added to the third mixer. In an example, the water-soluble polymer may be glycerin.

In step 306B, the third mixer may be turned on and set to mix with at a predetermined rotational speed. The rotational speed of the third mixer may range from approximately 30 to approximately 60 rotations per minute (rpm). The third mixer may contain one or more mixing paddles configured to reduce the incorporation of gas bubbles during mixing and may also rotate the paddles in a specific pattern configured to reduce bubble formation and incorporation. The first component solution and the one or more liquid ingredients may be mixed together for approximately 5 minutes. However, it will be appreciated that a shorter mixing time may also yield acceptable results. Furthermore, the mixing time may be extended for a longer time if necessary.

In step 308B, the third mixer may be stopped and the first component solution may be added before mixing is resumed at a rotational speed ranging from approximately 30 to approximately 60 rotations per minute (rpm). The mixing may be for approximately 5 mins, although longer and shorter periods of time are contemplated.

In step 310B, the one or more of enzymes and preservatives and optionally one or more fragrances may be added to the third mixer and allowed to mix. The enzymes may include one or more of amylase, protease, lipase, and cellulase. The preservatives may include sodium benzoate and similar salts (e.g., calcium benzoate and potassium benzoate). What is desirable is to provide a preservative which inhibits growth of microbes and fungi. It will be appreciated by persons skilled in the art that other preservatives may be used in combination such as potassium sorbate, or other weak acids. All such other preservatives are within the scope of the present disclosure.

The one or more fragrances may be non-toxic and non-irritating. The one or more fragrances may include, for example, one or more of extract. In an example, the extract may be organic. For example, the one or more fragrancies may include organic lemongrass extract. The organic lemongrass may be an essential oil and may be steam extracted from fresh grass and roots of a lemongrass plant. In another example, the one or more fragrances may include conventional fragrances that are typically used in applications such as soap, detergents, and personal care applications (e.g., lotion, shampoo, and liquid soap). For example, the one or more fragrances may include fresh linen, such as the Fresh Linen Fragrance Oil distributed by Bulk Apothecary.

In step 312B, the mixer may be allowed to run until the final solution is smooth in texture. The mixing may be for approximately 5 mins, although longer and shorter periods of time are contemplated.

Once the final mixture is smooth, it may be dispensed to form the dissolvable cleaning products as described below. In an example, additional water may be added to decrease the viscosity of the final solution to assist with the dispensing process. The additional water may be approximately 3 wt % to approximately 75 wt % of the final solution.

As will be appreciated by persons skilled in the art, glycerin and water are commonly used to provide flexibility and elongation of the polymer. However, while water evaporates, glycerin does not. Thus, the addition of glycerin may help to provide a flexible cleaning product with a more pleasant texture and feel. The amount of glycerin may be increased to accommodate for various relative humidity conditions at the cleaning product manufacturing plant if relative humidity is not controlled. As will be appreciated, this consideration relates to glycerin-water hysteresis.

Furthermore, it will be appreciated by persons skilled in the art that it may be desirable to add fragrances, dyes, as well as other ingredients, such as for example, optical brighteners, enzymes, fabric softeners, bleaches, water softening agents, chelates, soil anti-redeposition agents, color-protecting agents, dye-transfer agents, known in the art, or later discovered, to impart expected characteristics or qualities to the resulting cleaning products. All such modifications to the additional components are comprehended by the present disclosure.

In an example, the final solution may include, but is not limited to, one or more of: approximately 1 wt % to approximately 2 wt % of the water-soluble cellulose ethers, approximately 8 wt % to approximately 11 wt % of the surfactant, approximately 1.5 wt % to approximately 3 wt % of the sodium citrate, approximately 1 wt % to approximately 2 wt % of the enzymes, approximately 0.1 wt % to approximately 1 wt % of the preservatives, approximately 6 wt % to approximately 9 wt % of the water-soluble polymer, and approximately 72 wt % to approximately 82.4 wt % of water. For example, the final solution may include one or more of: approximately 2 wt % of the water-soluble cellulose ethers, approximately 10 wt % of the surfactant, approximately 2 wt % of the sodium citrate, approximately 2 wt % the enzymes, approximately 0.4 wt % of the preservatives, approximately 8 wt % of the water-soluble polymer, and approximately 77 wt % of water.

In another example, the final solution may include, but is not limited to, one or more of: approximately 1.6 wt % to approximately 2.4 wt % of the water-soluble cellulose ethers, approximately 8 wt % to approximately 12 wt % of the surfactant, approximately 1.6 wt % to approximately 2.4 wt % of the sodium citrate, approximately 6.4 wt % to approximately 9.6 wt % of the water-soluble polymer, and approximately 62.4 wt % to approximately 93.6 wt % of water. For example, the final solution may include one or more of: approximately 2 wt % of the water-soluble cellulose ethers, approximately 10 wt % of the surfactant, approximately 2 wt % of the sodium citrate, approximately 8 wt % of the water-soluble polymer, and approximately 78 wt % of water.

In another example, the final solution may include, but is not limited to, one or more of: approximately 1.2 wt % to approximately 1.9 wt % of the water-soluble cellulose ethers, approximately 7.8 wt % to approximately 11.7 wt % of the surfactant, approximately 1.9 wt % to approximately 2.8 wt % of the sodium citrate, approximately 0.3 wt % to approximately 0.8 wt % of the preservatives, approximately 6.2 wt % to approximately 9.4 wt % of the water-soluble polymer, and approximately 62.5 wt % to approximately 93.8 wt % of water. For example, the final solution may include one or more of: approximately 1.6 wt % of the water-soluble cellulose ethers, approximately 9.8 wt % of the surfactant, approximately 2.3 wt % of the sodium citrate, approximately 0.4 wt % of the preservatives, approximately 7.8 wt % of the water-soluble polymer, and approximately 78.1 wt % of water.

In another example, the final solution may include, but is not limited to, one or more of: approximately 1.2 wt % to approximately 1.9 wt % of the water-soluble cellulose ethers, approximately 7.8 wt % to approximately 11.7 wt % of the surfactant, approximately 1.9 wt % to approximately 2.8 wt % of the sodium citrate, approximately 0.3 wt % to approximately 0.8 wt % of the preservatives, approximately 6.2 wt % to approximately 9.4 wt % of the water-soluble polymer, approximately 62.5 wt % to approximately 93.8 wt % of water, and approximately 0.2 wt % to approximately 1 wt % of the one or more fragrances. For example, the final solution may include one or more of: approximately 1.6 wt % of the water-soluble cellulose ethers, approximately 9.8 wt % of the surfactant, approximately 2.3 wt % of the sodium citrate, approximately 0.4 wt % of the preservatives, approximately 7.8 wt % of the water-soluble polymer, approximately 77.6 wt % of water, and approximately 0.5% of the one or more fragrances.

Figure 4:
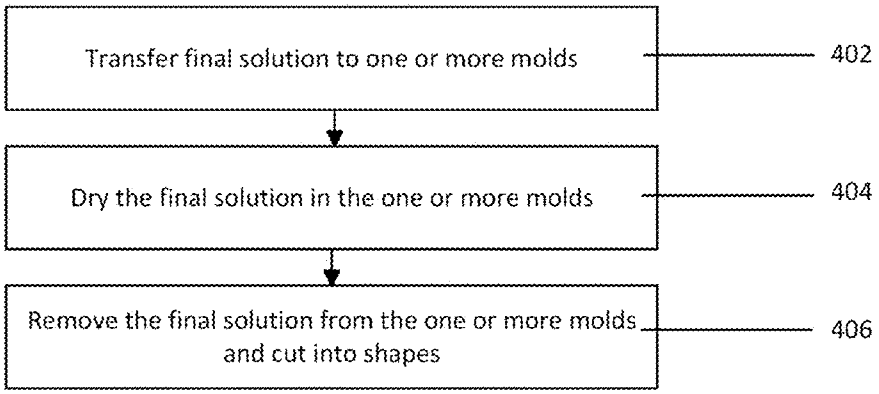
FIG. 4 is a flowchart illustrating an exemplary process of forming of dissolvable cleaning products from the final solution using one or more molds, according to an example of the present disclosure.

Referring now to FIG. 4, a flowchart illustrating an exemplary process of forming of the dissolvable cleaning products from the final solution using one or more molds is shown. The exemplary process of forming dissolvable cleaning product from the final solution using one or more molds may include transferring the final solution to one or more molds, drying the final solution in the one or more molds, removing the dehydrated final solution from the one or more molds, and the dehydrated final solution cutting into shapes.

In step 402, the final solution may be transferred into one or more molds. In an example, the one or more molds may be substantially rectangular and approximately 25" to approximately 50" wide. However, other shapes and sizes are contemplated. The one or more molds may include food grade silicon rubber. The one or more molds may be maneuvered to evenly distribute the final solution and positioned flat and level to produce an even thickness of mixture/finished product. In an example, the one or more molds may be vibrated (e.g., for 2 mins) to reduce excess bubbles.

In step 404, the final solution in the one or more molds may be dried until it reaches a predetermined moisture content and may be removed from the one or more molds. The final solution in the one or more molds may be placed in a dehydrator. The dehydrator may be set to approximately 30° C. to approximately 70° C. In an example, dehydrator may be set to approximately 66° C. The molds may be in the dehydrator for approximately 3 to approximately 5 hours. In an example, the molds may be dried in the dehydrator for approximately 4 hours. In an example, an intake of the dehydrator may be partially opened (e.g., by $\frac{1}{4}^{th}$) after 30 minutes of drying to allow for ventilation. Varying the temperature of the dehydrator and timing of dehydration may either slow down or speed up the drying process as needed (e.g., depending on batch size). In another example, the final solution in the one or more molds may be freeze-dried until dry enough to remove from the one or more molds.

Depending on the drying conditions, the dried final solution may contain varying residual amounts of water. The final solution may be sufficiently dry enough when it has reached a moisture range of approximately 6 wt % to approximately 12 wt % of water. One skilled in the art will understand that adding additional water to the final solution to decrease the viscosity will slow down the drying process.

In step 406, the final solution may be removed from the molds and cut into one or more desired shapes. In an example, the final solution may be coated in sodium bicarbonate to allow for easier handling. The one or more desired shapes may be sheets/strips. The strips may come in sheets that are approximately 4" by approximately 4" in dimension. Each sheet may weigh approximately 3.8 g. Each sheet may contain two strips separated down the middle by a feature (e.g., a perforation, indentation, etc.) that allows the strips to be separated. The sheets may be flexible. Each strip may be approximately 2" by approximately 4" (i.e., one half the sheet) in dimension. Each strip may be an amount to be used by the customer for one load of laundry.

The cutting process may include one or more of mechanical cutters (i.e. longitudinal cutters and transverse cutters), laser beams, stamps, dies, etc., as will be appreciated by persons skilled in the art.

Figure 5:
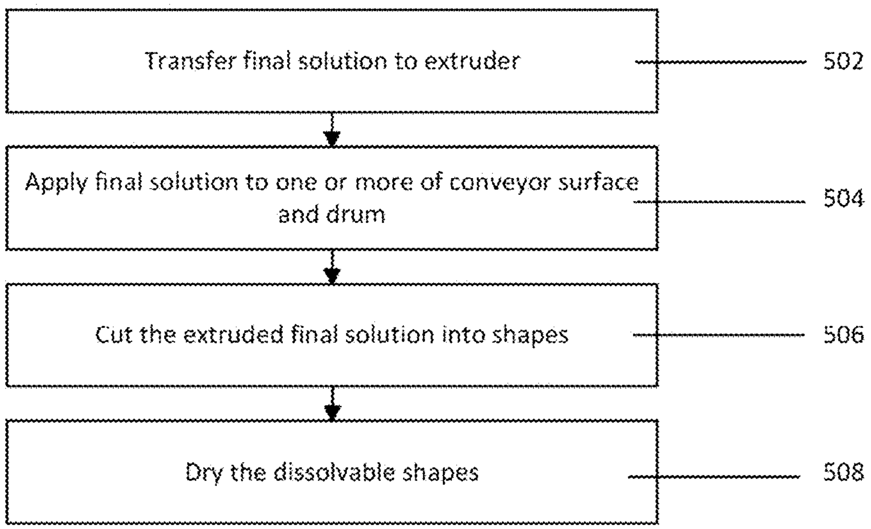
FIG. 5 is a flowchart illustrating an exemplary process of forming of the dissolvable cleaning products from the final solution using an extrusion process, according to an example of the present disclosure.

Referring now to FIG. 5, a flowchart illustrating an exemplary process of forming of the dissolvable cleaning products from the final solution using an extrusion process is shown. The exemplary process of forming the dissolvable cleaning products from the final solution using an extrusion process may include transferring the final solution to an extruder, applying the final solution to one or more of a conveyor surface and a drum, cutting the extruded final solution into shapes, and drying the dissolvable shapes.

In step 502, the final solution may be transferred to an extruder.

In step 504, the final solution may pass though the extruder and may be applied onto one or more of a conveyor surface and a drum. The conveyor surface and the drum may be heated to facilitate drying of the final solution.

As it exits the extruder, the final solution may pass through a precisely shaped die such that it forms a layer on the conveyor surface in a desired shape and weight. The die may be of any shape and may include one or more openings to divide the final solution into one or more portions, simultaneously, as it moves onto the conveyor.

In step 506, a cutting device may be placed after the die to cut the one or more portions of the extruded final solution into one or more desired shapes. The one or more desired shapes may be strips. The cutting process may use one or more of mechanical cutters (i.e. longitudinal cutters and transverse cutters), laser beams, stamps, dies, etc., as will be appreciated by persons skilled in the art.

In step 508, the dissolvable shapes may be dried. The drying step may be an active drying step. Drying may be carried out at elevated temperatures, such as up to 50° C. The drying may be carried out for a suitable duration that allows for the control of the amount of residual moisture in the desired dissolvable shape. Suitable drying times will vary depending upon the conditions and composition of the final solution and target final moisture content. Depending on the drying conditions, the final dissolvable shape may contain varying residual amounts of water.

It will be appreciated that the viscosity and density of the first component solution may govern the viscosity and density of the final solution. Furthermore, the viscosity and density of the second component solution may control dimensions of the final solution cleaning product shape applied to the conveyor surface upon exiting the chilled extruder, and ultimately the dimensions of the dissolvable cleaning product. If the viscosity of the first component solution is too low, additional amounts of water-soluble cellulose ethers may be added to the mixture to increase the viscosity to the desired viscosity range. If the viscosity of the first component solution is too high, water may be added to the mixture to reduce the viscosity to the desired viscosity range. If the viscosity of the second component solution is too low, additional amounts of surfactant may be added to the mixture to increase the viscosity to the desired viscosity range. If the viscosity of the second component solution is too high, water may be added to the mixture to reduce the viscosity to the desired viscosity range.

In an example, the dissolvable cleaning products may include approximately 6.1 wt % to approximately 6.7 wt % of the water-soluble cellulose ethers, approximately 38.4 wt % to approximately 41.9 wt % of the surfactant, approximately 9.2 wt % to approximately 10.1 wt % of the sodium citrate, approximately 1.5 wt % to approximately 1.7 wt % of the preservatives, approximately 30.7 wt % to approximately 33.6 wt % of the water soluble polymer, and approximately 6 wt % to approximately 12 wt % of water. The dissolvable cleaning product may further include approximately 2.0 wt % to approximately 2.1 wt % of the one or more fragrances.

It is important to note that this methodology and formulation may be adjusted to make almost any shape of final product, and the composition of the final products may be adjusted for various uses of cleaning products.

Additionally, these products may include those added to reusable bottles where it is best to apply as them as liquids. Products such as dish, handwashing, body, shampoos, auto, pets, pressure washers and any application where such a product is currently supplied in liquid bottles, thereby reducing waste from such containers.

In general, terminology may be understood at least in part from usage in context. For example, terms, such as “and”, “or”, or “and/or,” as used herein may include a variety of meanings that may depend at least in part upon the context in which such terms are used. Typically, “or” if used to associate a list, such as A, B or C, is intended to mean A, B, and C, here used in the inclusive sense, as well as A, B or C, here used in the exclusive sense. In addition, the term “one or more” as used herein, depending at least in part upon context, may be used to describe any feature, structure, or characteristic in a singular sense or may be used to describe combinations of features, structures or characteristics in a plural sense. Similarly, terms, such as “a,” “an,” or “the,” again, may be understood to convey a singular usage or to convey a plural usage, depending at least in part upon context. In addition, the term “based on” may be understood as not necessarily intended to convey an exclusive set of factors and may, instead, allow for existence of additional factors not necessarily expressly described, again, depending at least in part on context.

The present disclosure is described with reference to diagrams and operational illustrations of methods and devices. It is understood that each block of the diagrams or operational illustrations, and combinations of blocks in the diagrams or operational illustrations, may be implemented by means of analog or digital hardware and computer program instructions. These computer program instructions may be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the diagrams or operational block or blocks. In some alternate implementations, the functions/acts noted in the blocks may occur out of the order noted in the operational illustrations. For example, two blocks shown in succession may be executed substantially concurrently or the blocks may sometimes be executed in the reverse order, depending upon the functionality/acts involved.

Those skilled in the art will recognize that the methods and systems of the present disclosure may be implemented in many manners and as such are not to be limited by the foregoing examples. In other words, functional elements being performed by single or multiple components, in various combinations of hardware and software or firmware, and individual functions, may be distributed among software applications at either the client level or server level or both.

In this regard, any number of the features of the different examples described herein may be combined into single or multiple examples, and alternate examples having fewer than, or more than, all of the features described herein are possible.

Functionality may also be, in whole or in part, distributed among multiple components, in manners now known or to become known. Thus, a myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the examples of methods presented and described as flowcharts in this disclosure are provided by way of example in order to provide a more complete understanding of the technology. The disclosed methods are not limited to the operations and logical flow presented herein. Alternative examples are contemplated in which the order of the various operations is altered and in which sub-operations described as being part of a larger operation are performed independently.

While various examples have been described for purposes of this disclosure, such examples should not be deemed to limit the teaching of this disclosure to those examples. Various changes and modifications may be made to the elements and operations described above to obtain a result that remains within the scope of the systems and processes described in this disclosure.

What is claimed is:

1. A method of forming dissolvable cleaning products, the method comprising:

forming a first component solution in a first mixer by:

adding a first portion of water to the first mixer, the first portion of water having a first temperature, adding water-soluble cellulose ethers to the first portion of water and mixing for a first mixing time to form a first mixture, and adding a second portion of water to the first mixture and mixing for a second mixing time, the second portion of water having a second temperature;

forming a second component solution in a second mixer by:

adding a third portion of water to the second mixer, the third portion of water having a third temperature, wherein one or more of the first temperature and the third temperature range from approximately 92° C. to approximately 95° C., and wherein the second temperature is less than or equal to approximately 4° C., adding a surfactant to the third portion of water and mixing for a third mixing time to form a second mixture, and adding sodium citrate to the second mixture and mixing for a fourth mixing time;

allowing the first component solution to rest for a first holding period;

allowing the second component solution to rest for a second holding period;

forming a final solution in a third mixer by:

adding the second component solution to the third mixer, adding glycerin to the third mixer and mixing for a fifth mixing time, ceasing mixing after the fifth mixing time, adding the first component solution to the third mixer after the fifth mixing time and mixing for a sixth mixing time, and adding one or more of a preservative and a fragrance to the third mixer and mixing for a seventh mixing time;

transferring the final solution to a mold;

drying the final solution within the mold to form a dried final solution;

removing the dried final solution from the mold; and cutting the dried final solution into one or more shapes.

2. The method of claim 1, wherein one or more of the first mixing time and the second mixing time is approximately 15 minutes.

3. The method of claim 1, wherein the third mixing time is approximately 40 minutes.

4. The method of claim 1, wherein one or more of the first holding period and the second holding period ranges from approximately 8 hours to approximately 24 hours.

5. The method of claim 1, wherein one or more of the fourth mixing time, the fifth mixing time, the sixth mixing time, and the seventh mixing time is approximately 5 minutes.

6. The method of claim 1, wherein the preservative comprises sodium benzoate.

7. The method of claim 1, wherein the surfactant comprises methyl ester sulfonate ("MES").

8. The method of claim 1, wherein the final solution comprises:

approximately 1.2 wt % to approximately 1.9 wt % of the water-soluble cellulose ethers;

approximately 7.8 wt % to approximately 11.7 wt % of the surfactant;

approximately 1.9 wt % to approximately 2.8 wt % of the sodium citrate;

approximately 0.3 wt % to approximately 0.8 wt % of the preservative;

approximately 6.2 wt % to approximately 9.4 wt % of the glycerin; and approximately 62.5 wt % to approximately 93.8 wt % of water.

9. The method of claim 8, wherein the final solution further comprises:

approximately 0.2 wt % to approximately 1 wt % of the fragrance.

10. The method of claim 1, wherein the step of drying the final solution within the mold comprises placing the mold in a dehydrator set to approximately 30° C. to approximately 70° C. for a drying time.

11. The method of claim 1, wherein the dried final solution comprises a moisture content ranging from approximately 6 wt % to approximately 12 wt % of water.

* * * * *